United States Patent [19]

Schmutz et al.

[11] 3,908,010

[45] Sept. 23, 1975

[54] BASICALLY SUBSTITUTED HETEROCYCLES AS ANTI-EMETICS

[75] Inventors: Jean Schmutz, Muri; Fritz Hunziker, Bern, both of Switzerland

[73] Assignee: Dr. A. Wander, Bern, Switzerland

[22] Filed: Jan. 22, 1974

[21] Appl. No.: 435,430

Related U.S. Application Data

[63] Continuation of Ser. No. 57,317, July 22, 1970, abandoned, which is a continuation-in-part of Ser. No. 769,373, Oct. 21, 1968, Pat. No. 3,539,573, which is a continuation of Ser. No. 712,956, March 14, 1968, abandoned.

[30] Foreign Application Priority Data

| Mar. 22, 1967 | Switzerland | 4103/67 |
| May 9, 1967 | Switzerland | 6557/67 |
| July 14, 1967 | Switzerland | 10115/67 |
| Nov. 3, 1967 | Switzerland | 15453/67 |

[52] U.S. Cl. ............................................. 424/250
[51] Int. Cl. ............................................. H61k 27/00
[58] Field of Search ................................... 424/250

[56] References Cited

UNITED STATES PATENTS 3,458,516   7/1969   Howell et al. ................ 424/250

*Primary Examiner*—Jerome D. Goldberg
*Attorney, Agent, or Firm*—Gerald D. Sharkin; Robert S. Honor; Thomas O. McGovern

[57] ABSTRACT

Certain 11-basically substituted dibenzo[b,f][1,4]thiazepines and dibenzo[b,e][1,4]diazepines are useful as anti-emetics.

4 Claims, No Drawings

BASICALLY SUBSTITUTED HETEROCYCLES AS ANTI-EMETICS

This application is a continuation of U.S. patent application, Ser. No. 57,317, filed July 22, 1970, now abandoned, which in turn is a continuation-in-part of copending application, Ser. No. 769,373, filed Oct. 21, 1968, which issued as U.S. Pat. No. 3,539,573, on Nov. 10, 1970, which in turn is a continuation of U.S. patent application, Ser. No. 712,956, filed Mar. 14, 1968, now abandoned.

This invention is concerned with pharmaceutical compositions containing dibenzo[b,f][1,4]thiazepines and dibenzo[b,e][1,4]diazepines and their use as anti-emetics.

The active agents with which this invention is concerned may be represented by the following structural formula:

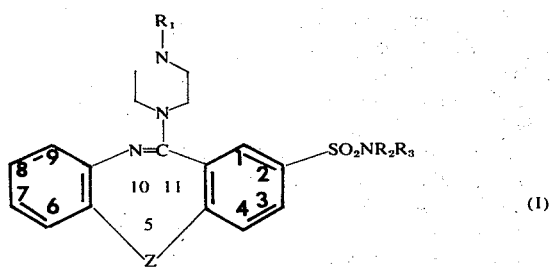

and acid addition salts thereof. In formula I, Z denotes sulphur, sulphinyl (—SO—) or imino (—NH—). $R_1$ represents hydrogen, allyl, alkyl containing not more than 3 carbon atoms, hydroxyalkyl containing not more than 3 carbon atoms, alkoxyalkyl containing not more than 6 carbon atoms of alkoyloxyalkyl containing not more than 6 carbon atoms. $R_2$ and $R_3$ are the same or different and represent hydrogen or methyl.

Compounds of formula I are obtained when a compound of the formula:

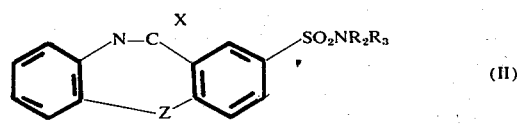

wherein Z, $R_2$ and $R_3$ have the meaning defined above and X denotes a residue capable of being split off with the hydrogen of amines, is reacted with piperazine or a piperazine derivatives, respectively, of the formula:

wherein $R_1$ has the above-mentioned meaning.

A residue capable of being split off with the hydrogen of amines, which can be bound ionically or covalently to the carbon atom, can most conveniently be represented by halogen, sulphydryl, or alkoxy and alkylthio which may be activated, e.g. methoxy, thiomethyl or p-nitrobenzylthio, or by tosyl.

Starting materials of the formula II are obtained by converting lactams of the formula:

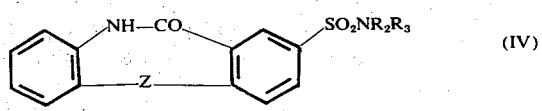

wherein Z, $R_2$ and $R_3$ have the meaning given above, into the thiolactams which may be followed by alkylation, or by reaction of the lactams with a halogenating agent such as phosphorus oxychloride or phosphorus pentachloride, most suitably in the presence of a catalytic amount of dimethylaniline or dimethylformamide. Lactams of formula IV are themselves obtained by ring closure of compounds of the formula:

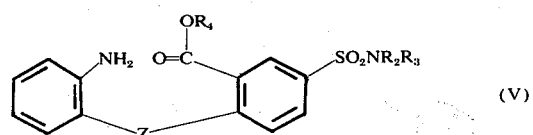

wherein Z, $R_2$ and $R_3$ have the above-mentioned meaning and $R_4$ denotes hydrogen or lower alkyl. For products wherein Z represents —S—, lactams of formula IV may also be obtained by ring closure of compounds of the formula:

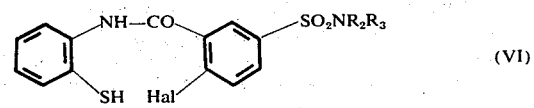

wherein Hal stands for halogen, or of isocyanates of the formula:

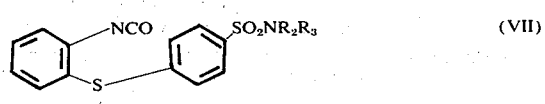

Compounds of formula I may further be obtained by ring closure through intramolecular condensation of acid amides or acid thioamides of the formula:

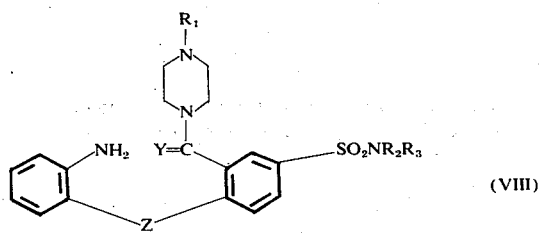

wherein Z, $R_1$, $R_2$ and $R_3$ have the above-mentioned meaning and Y represents oxygen or sulphur. A purely thermal condensation rarely succeeds with the acid amides but rather with the thioamides which are, for example, obtained from the acid amides by treatment with phosphorus pentasulphide and need not be isolated before the following condensation. Especially in the case of the acid amides it is desirable to perform the ring closure in the presence of condensing agents, such as phosphorus pentachloride, phosphorus oxychloride, phosgene, polyphosphoric acid, and the like. It is assumed that the ring closure proceeds by way of intermediate steps such as imidochlorides, amidochlorides, imidophosphates, amidophosphates or salt-like derivatives thereof, which, in general, are not isolatable. The condensation of the thioamides is favoured by the presence of mercury(II) salts or by intermediate formation of imidothioethers which may be activated. Heating and, if required, the use of a suitable inert solvent are desirable, and when using phosphorus oxychloride and phosphorus pentachloride addition of catalytic amounts of dimethylformamide or dimethylaniline.

11-Basically substituted dibenzo[b,f][1,4]thiazepines (formula I; Z = —S—) can also be obtained by dehydration of urea derivatives of the formula:

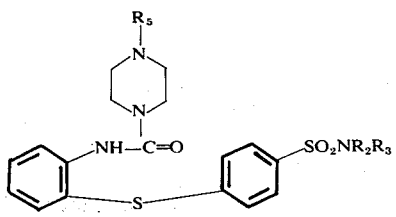

(IX)

wherein $R_2$ and $R_3$ have the above-mentioned meaning and $R_5$ means $R_1$ or denotes a removable group, especially a hydrolytically removable group. The ring closure is preferably carried out by heating in the presence of dehydrating agents such as zinc chloride, aluminum chloride, stannic chloride, phosphoric acid, polyphosphoric acid and the like, especially phosphorus oxychloride or phosphorus oxychloride and phosphorus pentoxide, if desired in an inert solvent of suitable boiling point such as benzene or toluene etc. According to the chosen reaction conditions the starting materials of formula IX with a hydrolytically removable group $R_5$, e.g. carboalkoxy, especially carbethoxy, are cyclicized directly to the 11-(1-piperazinyl) compounds by hydrolysis of the removable group. Other removable groups can be split off after ring closure in a way known per se, e.g. by hydrogenolysis.

The products of formula I can also be obtained when amidines of the formula:

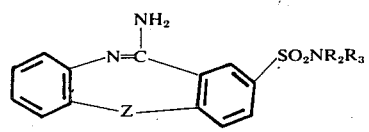

(X)

wherein Z, $R_2$ and $R_3$ have the above-mentioned meaning, are treated with a reactive ester of an alcohol of the formula:

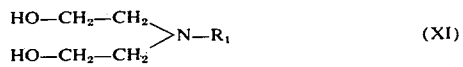

(XI)

wherein $R_1$ has the above-mentioned meaning. The reaction is carried out following or by simultaneous treatment with a basic catalyst or metallization agent such as sodamide, lithium amide, sodium hydride, butyl lithium, phenyl sodium, sodium ethylate or potassium-t-butoxide. Suitable esters are those of inorganic or organic acids, e.g. hydrohalidic acid, sulphonic acid or carbonic acid esters. The required amides X are in turn obtained by treating compounds of formula II with ammonia.

Compounds of formula I, wherein Z denotes sulphinyl, are also obtained by oxidation, e.g. with periodates, of the corresponding compounds in which Z represents sulphur.

Finally, compounds of formula I are obtained when corresponding compounds containing the group —$SO_2X$ instead of —$SO_2NR_2R_3$, wherein X denotes a residue which is removable with the hydrogen of amines, especially halogen, are reacted with ammonia or an amine of the formula $HNR_2R_3$, wherein $R_2$ and $R_3$ have the above defined meanings. Starting materials containing a sulphochloride group (—$SO_2Cl$) are obtained by diazotization of the corresponding amino compounds followed by the Meerwein reaction.

Compounds of formula I, obtained according to one of the above methods, wherein $R_1$ represents hydrogen can be converted to such compounds wherein $R_1$ does not represent hydrogen, e.g. by treatment with reactive esters of alcohols of the formula $R_1$—OH. Hydrohalic acid or toluenesulphonic acid esters are suitable for this purpose. An alkyl group $R_1$ can also be introduced by the method of reductive alkylation, i.e. by reaction with corresponding aldehydes either with hydrogen in the presence of a catalyst or with a reducing agent such as formic acid. The introduction of a hydroxyalkyl group $R_1$ can also be carried out by treating with a corresponding alkylene oxide.

Compounds of formula I in which $R_1$ denotes a hydroxyalkyl group can be subsequently treated with an acylating agent to obtain products wherein $R_1$ represents an alkoyloxyalkyl group. Acid chlorides and acid anhydrides are especially suitable as acylating agents.

The bases obtained in this manner are in most cases crystalizable or can otherwise be distilled in high vacuum without decomposition and react with inorganic and organic acids such as hydrochloric acid, hydrobromic acid, sulphuric acid, nitric acid, phosphoric acid, acetic acid, oxalic acid, maleic acid, succinic acid, tartaric acid, toluene sulphonic acid and the like to form pharmaceutically acceptable acid addition salts which are stable in water, in which form the products may also be used.

The bases obtained in the described manner and their acid addition salts are new compounds which can be used as active substances in pharmaceuticals or as intermediates for the production of such substances. They produce a favorable effect on the central nervous system and may therefore be used especially as anti-emetics, as indicated previously. The anti-emetic activity is pharmacologically shown by a strong apomorphine antagonising effect in dogs and rats as well as a comperatively weak cataleptic and locomotor activity suppressing effect. Especially pronounced anti-emetic activity is shown by 2-dimethylaminosulphonyl-11-(4-methyl-1-piperazinyl)-dibenzo[b,f][1,4]-thiazepine obtained according to Example 1 and its acid addition salts.

For such usage, compound (I) may be administered enterally or parenterally as such or admixed with conventional pharmaceutical carriers. They may be administered enterally in such forms as suppositories, tablets, dispersible powders, granules, capsules, syrups and elixirs, and parenterally as solutions, suspensions, dispersions, emulsions, and the like, e.g., a sterile injectable aqueous suspension. The composition for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluent, such as calcium carbonate, sodium carbonate, lactose and talc, granulatinig and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and clixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 90 percent of the active ingredient in combination with the carrier or adjuvant.

The dosage of active ingredient employed for the alleviation of emesis in mammals may vary depending on the particular compound employed and the severity of the condition being treated. However, in general, satisfactory results are obtained when the compounds (I) are administered at a dailydosage of from about 0.07 to about 50 milligrams/kilogram of animal body weight. For most large mammals such as primates, the administration of from about 5 to about 400 milligrams of compound (I) per day provides satisfactory results. Preferred dosage forms suitable for internal use comprise from about 10 to about 25 milligrams of the active compound in intimate admixture with a solid or liquid pharmaceutically acceptable carrier or diluent.

The preferred pharmaceutical compositions from the standpoint of preparation and ease of administration are tablets containing about 10 to 25 milligrams of active ingredient.

EXAMPLE 1

4.5 g of 2-Dimethylaminosulphonyl-10,11-dihydro-11-oxodibenzo[b,f][1,4]thiazepine (m.p. 283°–284°C) and 1.3 ml of N,N-dimethylaniline are refluxed in 40 ml of phosphorus oxychloride for 4.5 hours. The excess phosphorus oxychloride is then distilled off in vacuo and the residue is dissolved in xylene. The xylene solution is poured onto ice/water, shaken out twice with dilute hydrochloric acid and once with water, dried over sodium sulphate and then concentrated to 100 ml in vacuo. 8 ml of N-methylpiperazine are added and the reaction mixture is refluxed for 4 hours and then treated with dilute soda lye and water. The xylene phase is separated and shaken out with dilute hydrochloric acid. The acid extracts are made alkaline with concentrated ammonia solution and the base which separates is extracted with chloroform. After drying over sodium sulphate the chloroform extracts are evaporated in vacuo. The residue is crystallized from acetone/petroleum ether whereby 4.9 g of 2-dimethylaminosulphonyl-11-(4-methyl-1-piperazinyl)-dibenzo[b,f][1,4]thiazepine are obtained in the form of slightly yellow needles of melting point 192°–193°C.

EXAMPLE 2

A solution of 3.42 g of sodium metaperiodate in 10 ml of water is given in 3 portions to a stirred solution of 6.24 g of 2-dimethylaminosulphonyl-11-(4-methyl-1-piperazinyl)-dibenzo-[b,f][1,4]thiazepine obtained according to Example 1, in 40 ml of water and 10 ml of glacial acetic acid at 0°C. A precipitate which appears is brought into solution by adding 20 ml of 2 N acetic acid. The reaction mixture is kept at room temperature for 24 hours, then made alkaline with concentrated soda lye and shaken out with chloroform. The chloroform extracts are washed with water, dried over sodium sulphate and evaporated to dryness in vacuo. The residue is crystallized from acetone/petroleum ether to give 5.9 g of 2-dimethylaminosulphonyl-11-(4-methyl-1-piperazinyl)-dibenzo[b,f][1,4]thiazepine-5-oxide of melting point 208°–210°C.

Further products corresponding to formula I given in the following table are obtained by analogous procedures to those given above. In the table Z, $R_1$, $R_2$ and $R_3$ have the above defined meaning. In the column on the right hand side ac means acetone, $e$ = ether, $ch$ = chloroform, $me$ = methanol and $pe$ = petroleum ether.

Table

| Example | Z | $R_1$ | $R_2$ | $R_3$ | melting point |
|---|---|---|---|---|---|
| 3 | \S/ | H | —CH₃ | —CH₃ | base: 186–188°C (from ch/c) |
| 4 | \NH/ | —CH₃ | —CH₃ | —CH₃ | base: 193–195°C (from ac/pe) |
| 5 | \NH/ | H | —CH₃ | —CH₃ | base: 147–150°C (from ac/pe) |
| 6 | \S/ | H | H | —CH₃ | base: 218–222°C (from ac/pe) |
| 7 | \S/ | —CH₃ | H | —CH₃ | base: 168–170°C (from ac/pe) |

EXAMPLE 8

For the manufacture of tablets, the products of this invention can be mixed with lactose and granulated with water, 0.5 % sodium alginate or 1 % gelatine solution. The dried granulate is compressed into tablets in the presence of about 5 % of talcum, 5 % of corn starch and 0.1% of magnesium stearate. In this way, there are obtained, e.g. tablets of the following composition:

| | |
|---|---|
| 2-Dimethylaminosulphonyl-11-(4-methyl-1-piperazinyl)-dibenzo[b,f][1,4]thiazepine | 25 mg |
| Lactose | 70 mg |
| Corn starch | 5 mg |
| Talcum | 5 mg |
| Magnesium stearate | 0.1 mg |

These 105 mg tablets, which are provided with a crackline, can be administered orally in a dosage of one half to two tablets one to three times per day in the treatment of subjects suffering from nausea and vomiting following operations or ray treatment or due to stomach or metabolism disorders, intoxications, drug incompatability, pressure on the brain or pregnancy. These tablets may also be used propylactically against post operative vomiting.

EXAMPLE 9

Dry Filled Capsules

Capsules suitable for oral administration which contain the following ingredients are prepared in a conventional manner. Such capsules are useful in treating emesis at a dose of one capsule 2 to 4 times a day.

| Ingredient | Weight (mg) |
|---|---|
| 2-Dimethylaminosulphonyl-11-(4-methyl-1-piperazinyl)dibenzo[b,f][1,4]thiazepine | 25 |
| Inert solid diluent (starch, lactose, kaolin) | 275 |

EXAMPLE 10

Sterile Solution for Injection

The following ingredients are dissolved in water for injection. The resulting solution is filtered through an appropriate medium to render a clear solution. The solution is then autoclaved to render it sterile.

| Ingredient | Weight (%) |
|---|---|
| 2-dimethylaminosulphonyl-11-(4-methyl-1-piperazinyl)dibenzo[b,f][1,4]thiazepine | 10 |
| Sodium alginate | 0.5 |
| Buffer system | As desired |
| Lecithin | 0.5 |
| Sodium chloride | As desired |
| Water for injection | To desired volume |

EXAMPLE 11

The following formulations for syrups or elixirs containing an effective amount of active compound may be formulatled using conventional methods.

| | % by Weight syrup | elixir |
|---|---|---|
| 2-dimethylaminosulphonyl-11-(4-methyl-1-piperazinyl)-dibenzo[b,f][1,4]thiazepine | .5–3.5 | .5–3.5 |
| Buffering system | quantity sufficient to adjust pH | |
| Sodium benzoate | .1–.5 | .1–.5 |
| Flavoring agent | .01–.2 | .01–.2 |
| Water | 20–40 | 5–20 |
| Simple syrup U.S.P. | 30–70 | 0 |
| Sorbitol solution (70%) | 10–30 | 20–60 |
| Certified dye | .5–2 | .5–2 |
| Alcohol | 0 | 2.5–20 |
| Methyl paraben | 0 | .05–.1 |
| Propyl paraben | 0 | .05–.1 |
| Sodium saccharin | 0 | .01–.08 |

What is claimed is:

1. A method for treating emesis, which comprises enterally or parenterally administering to a mammal in need of said treatment an anti-emetic effective amount of a compound of the formula:

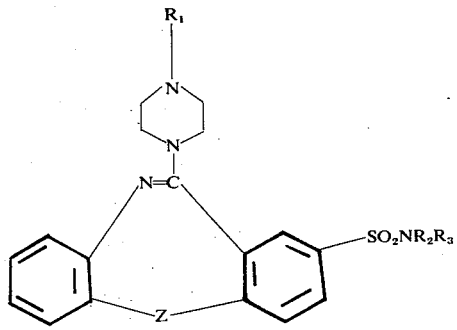

and pharmaceutically acceptable acid additional salts thereof, where Z denotes sulphur, $R_1$ represents hydrogen, allyl, alkyl containing not more than 3 carbon atoms, hydroxyalkyl containing not more than 3 carbon atoms, alkoxyalkyl containing not more than 6 carbon atoms or alkoyloxyalkyl containing not more than 6 carbon atoms and $R_2$ and $R_3$ are the same or different and represent hydrogen or methyl.

2. A method according to claim 1 in which the compound is 2-dimethylaminosulphonyl-11-(4-methyl-1-piperazinyl)-dibenzo[b,f][1,4]-thiazepine.

3. A method according to claim 1 wherein the compound is administered to a mammal in need of said treatment at a daily dose of from about 5 milligrams to about 400 milligrams.

4. A method according to claim 1 wherein the compound is administered to a mammal in need of said treatment in a unit dosage form comprising said compound to the extent of from about 10 milligrams to about 25 milligrams per unit dosage.

* * * * *

UNITED STATES PATENT OFFICE
CERTIFICATE OF CORRECTION

Patent No. 3,908,010          Dated September 23, 1975

Inventor(s) JEAN SCHMUTZ AND FRITZ HUNZIKER

It is certified that error appears in the above-identified patent and that said Letters Patent are hereby corrected as shown below:

Page 2, delete the present cross reference

"This is a continuation of application, Serial No. 57,317, filed July 22, 1970, which in turn is a continuation-in-part of copending application, Serial No. 769,373, filed October 21, 1968".

and insert in its place the following cross reference

--This application is a continuation of United States Patent Application, Serial No. 57,317, filed July 22, 1970, now abandoned, which in turn is a continuation-in-part of copending application, Serial No. 769,373, filed October 21, 1968, which issued as United States Patent No. 3,539,573, on November 10, 1970, which in turn is a continuation of United States Patent Application, Serial No. 712,956, filed March 14, 1968, now abandoned--.

Signed and Sealed this twenty-seventh Day of April 1976

[SEAL]

Attest:

RUTH C. MASON
Attesting Officer

C. MARSHALL DANN
Commissioner of Patents and Trademarks